(12) United States Patent
Carlough et al.

(10) Patent No.: US 8,572,141 B2
(45) Date of Patent: Oct. 29, 2013

(54) EXECUTION OF FIXED POINT INSTRUCTIONS USING A DECIMAL FLOATING POINT UNIT

(75) Inventors: Steven R. Carlough, Poughkeepsie, NY (US); Adam B. Collura, Hyde Park, NY (US); Mark A. Erle, Macungie, PA (US); Wen H. Li, Poughkeepsie, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 12/051,333

(22) Filed: Mar. 19, 2008

(65) Prior Publication Data

US 2009/0240753 A1 Sep. 24, 2009

(51) Int. Cl.
*G06F 15/00* (2006.01)
*G06F 7/00* (2006.01)
*G06F 7/52* (2006.01)

(52) U.S. Cl.
USPC ............ 708/200; 708/624; 708/652; 708/683

(58) Field of Classification Search
USPC .................. 708/623–624, 651–652, 680–685
See application file for complete search history.

(56) References Cited

U.S. PATENT DOCUMENTS

| | | | |
|---|---|---|---|
| 4,476,537 A | 10/1984 | Blau et al. | |
| 4,511,990 A | 4/1985 | Hagiwara et al. | |
| 4,620,292 A | 10/1986 | Hagiwara et al. | |
| 5,301,137 A | 4/1994 | Matsuo et al. | |
| 5,369,607 A | 11/1994 | Okamoto | |
| 5,745,399 A * | 4/1998 | Eaton et al. | 708/673 |
| 2003/0110197 A1 | 6/2003 | Hansen et al. | |
| 2004/0230634 A1* | 11/2004 | Busaba et al. | 708/651 |
| 2005/0065990 A1 | 3/2005 | Allen | |
| 2006/0179103 A1* | 8/2006 | Carlough et al. | 708/670 |
| 2007/0061387 A1* | 3/2007 | Carlough et al. | 708/204 |
| 2007/0266072 A1 | 11/2007 | Cornea-Hasegan | |

OTHER PUBLICATIONS

Elsen et al, IBM POWER6 accelerator: VMX and DFU, IBM J. Res. & Dev. vol. 51, No. 6, Nov. 2007, pp. 1-21.*
Pentium Processor—Floating Point Unit, johnloomis.org, May 1999, pp. 1-53.*
Krishna et al, Novel. High-Speed 16-Digit BCD Adders Conforming to IEEE 754r Format, IEEE Computer Society Annual Symposium on VLSI, 2007, pp. 1-6.*
Schwarz et al, Power6 Decimal Divide, IEEE, 2007, pp. 128-133.*

(Continued)

*Primary Examiner* — Chat Do
*Assistant Examiner* — Kevin G Hughes
(74) *Attorney, Agent, or Firm* — Cantor Colburn LLP; John Campbell (57) ABSTRACT

A decimal floating point (DFP) unit is used to execute fixed point instructions. Two or more operands are accepted, wherein each operand is in a packed binary coded decimal (BCD) format. Any invalid BCD formats are detected by checking the operands for any invalid BCD codes. It is determined if an exception flag exists and, if so, outputting the flag; it is determined if a condition code exists and, if so, outputting the code. An operation is performed on the two or more operands to generate a result; wherein the operation takes place directly on BCD data, thus using the DFP unit to perform a BCD operation; appending a result sign to the result of the operation; and providing the result of the operation and the appended result sign as a result output in a packed BCD format.

12 Claims, 4 Drawing Sheets

(56) References Cited

OTHER PUBLICATIONS

Schwarz et al, A Decimal Floating-Point Specification, IEEE, 2001, pp. 147-154.*

Schwarz et al, The S/390 G5 floating point unit, IBM 1. Res. Develop. vol. 43 No. 5/6 Sep./Nov. 1999, pp. 707-721.* z/Architecture Principles of Operation, International Business Machines Corporation, SA22-7832-05, Sixth Edition (Apr. 2007).

* cited by examiner

EXECUTION OF FIXED POINT INSTRUCTIONS USING A DECIMAL FLOATING POINT UNIT

BACKGROUND OF THE INVENTION

This invention relates to computer systems and, in particular, to processors that execute decimal arithmetic.

Decimal floating-point operations are becoming increasingly important in commercial transactions, resulting in manufacturers adding hardware specifically designed to execute these operations. Decimal fixed-point operations are equally important and are typically executed in a fixed-point unit of a processor. Additional hardware is usually required in the fixed-point unit to facilitate the execution of these decimal fixed-point instructions. This is important real estate (i.e., occupied space) in a processor with the effect that, as area is added to the stack, there is a potential impact on cycle time. Furthermore, the fixed-point unit contains a 64-bit (or 16-digit) dataflow but the operands for these decimal operations can be up to 31 digits long plus a sign digit, resulting in 128-bit operations. Operations with operands longer then 16 digits must be broken up into smaller operations, which adversely impacts performance. What is needed is an improved technique for executing decimal fixed-point instructions.

BRIEF SUMMARY OF THE INVENTION

An exemplary embodiment includes a method for using a decimal floating point (DFP) unit to execute a fixed point instruction. The method comprises accepting two or more operands each in a packed binary coded decimal (BCD) format; detecting any invalid BCD formats by checking the operands for any invalid BCD codes; determining if an exception flag exists and, if so, outputting the exception flag; determining if a condition code exists and, if so, outputting the condition code; performing a coefficient operation on the accepted two or more operands to generate a result; wherein the coefficient operation takes place directly on BCD data, thus using the DFP unit to perform a BCD operation comprising the coefficient operation; appending a result sign to the result of the coefficient operation; and providing the result of the coefficient operation and the appended result sign as a result output in a packed BCD format.

A hardware product and a computer program product corresponding to the foregoing method are also disclosed herein. Other methods, computer program products, and/or hardware products according to embodiments will be or become apparent to one with skill in the art upon review of the following drawings and detailed description. It is intended that all such additional methods, computer program products, and/or hardware products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

The detailed description explains the preferred embodiments of the invention, together with advantages and features, by way of example with reference to the drawings.

DETAILED DESCRIPTION

Figure 1:
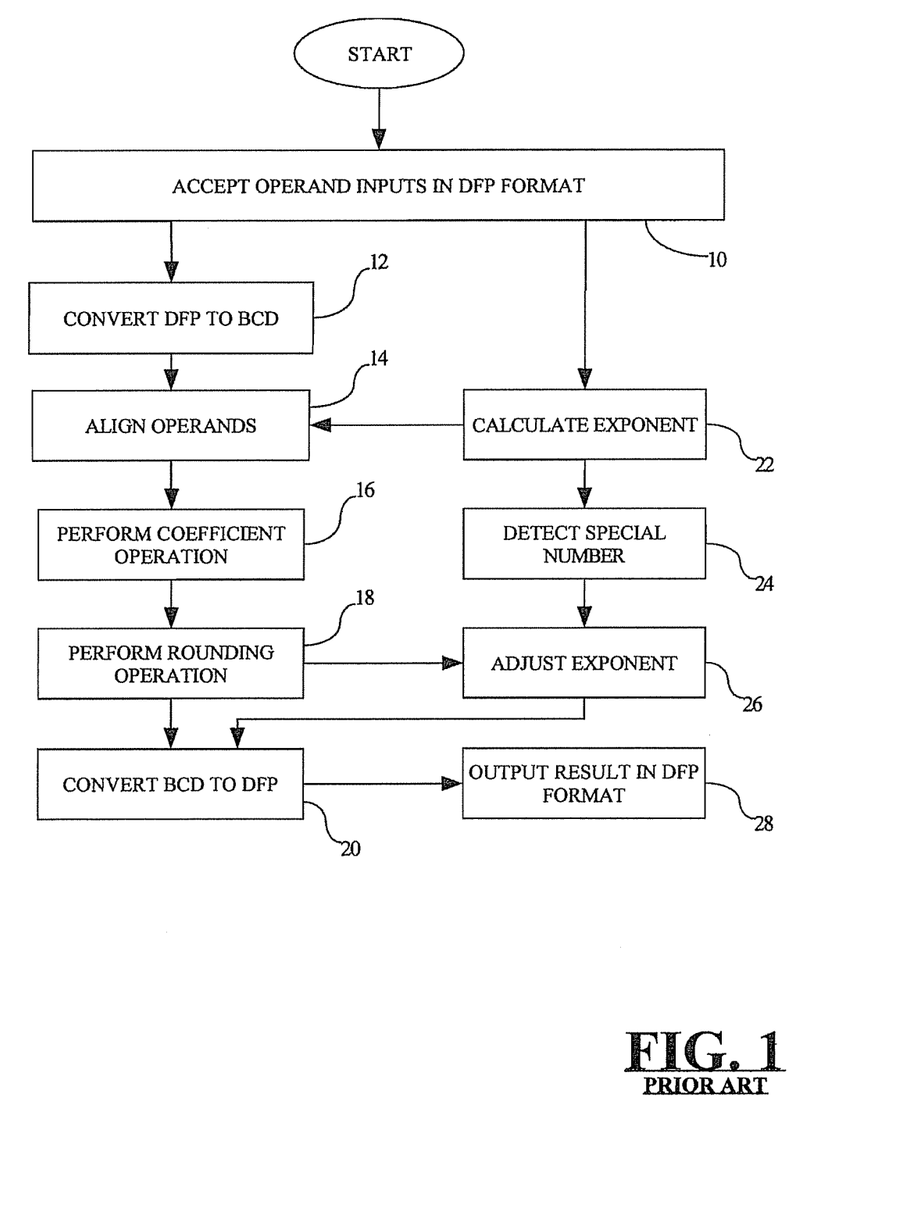
FIG. 1 sets forth a prior art operational sequence for performing a typical decimal floating point operation.

FIG. 1 sets forth a prior art operational sequence for performing a typical decimal floating point operation. The operational sequence commences at block 10 where one or more operand inputs are accepted in decimal floating point (DFP) format. Next, at block 12, the operand inputs are converted from DFP to binary-coded decimal (BCD) using a DFP to BCD decoder. At block 22, the exponent part of the operand is sent to an exponent calculator which calculates a resulting exponent depending on the nature of an operation to be performed. More specifically, the resulting exponent may consist of the exponent of the smaller of the two operands, the exponent of the larger of the two operands, the difference between the exponents, the sum of the exponents, or several other possibilities. Note that blocks 12 and 22 may be performed in parallel or in any order.

At block 14, the operands are aligned using an operand alignment mechanism. The operand alignment mechanism utilizes information obtained by the exponent calculation of block 22 to determine how a BCD coefficient portion of one or both of the operands needs to be shifted to properly align the operands. The operands are aligned using the result of the DFP to BCD conversion step of block 12. At block 16, a coefficient operation is performed on the aligned operands which, pursuant to the step of block 14, now include exponents that are properly aligned. The coefficient operations of block 16 may include computing the sum, the difference, the product, or the quotient of the BCD coefficients. Several other operations may take place in the coefficient operation 16 block as well, including a conversion to or from a binary number[SRC1]. The result of the coefficient operation is then rounded at block 18 where a rounding operation is performed. Rounding occurs based on a state of the rounding mode held in a processor that implements the method of FIG. 1, or rounding occurs based on an instruction.

After the exponents are calculated at block 22, the operational sequence of FIG. 1 progresses to block 24 where any special numbers are detected and set. These special numbers may include infinity (a value so large that the precision of the coefficient and exponent fields is unable to represent the number), NaN (not a number, e.g., the result when zero is divided by zero), Nmin (the smallest representable number before loss of precision occurs), Nmax (the largest representable number within the prescribed precision) as well as several other special numbers needed for decimal floating point operations. The special number detection of block 24 generates an intermediate resulting exponent which is adjusted at block 26 based upon the rounding operation of block 18. The intermediate results from the rounding operation of block 18 and the exponent adjustment operation of block 26 are converted from BCD to DFP at block 20 where these intermediate results are merged back into the final result in DFP format. The result is outputted in DFP format at block 28. Condition codes and exception flags (not shown) may also be outputted at block 28.

Figure 2:
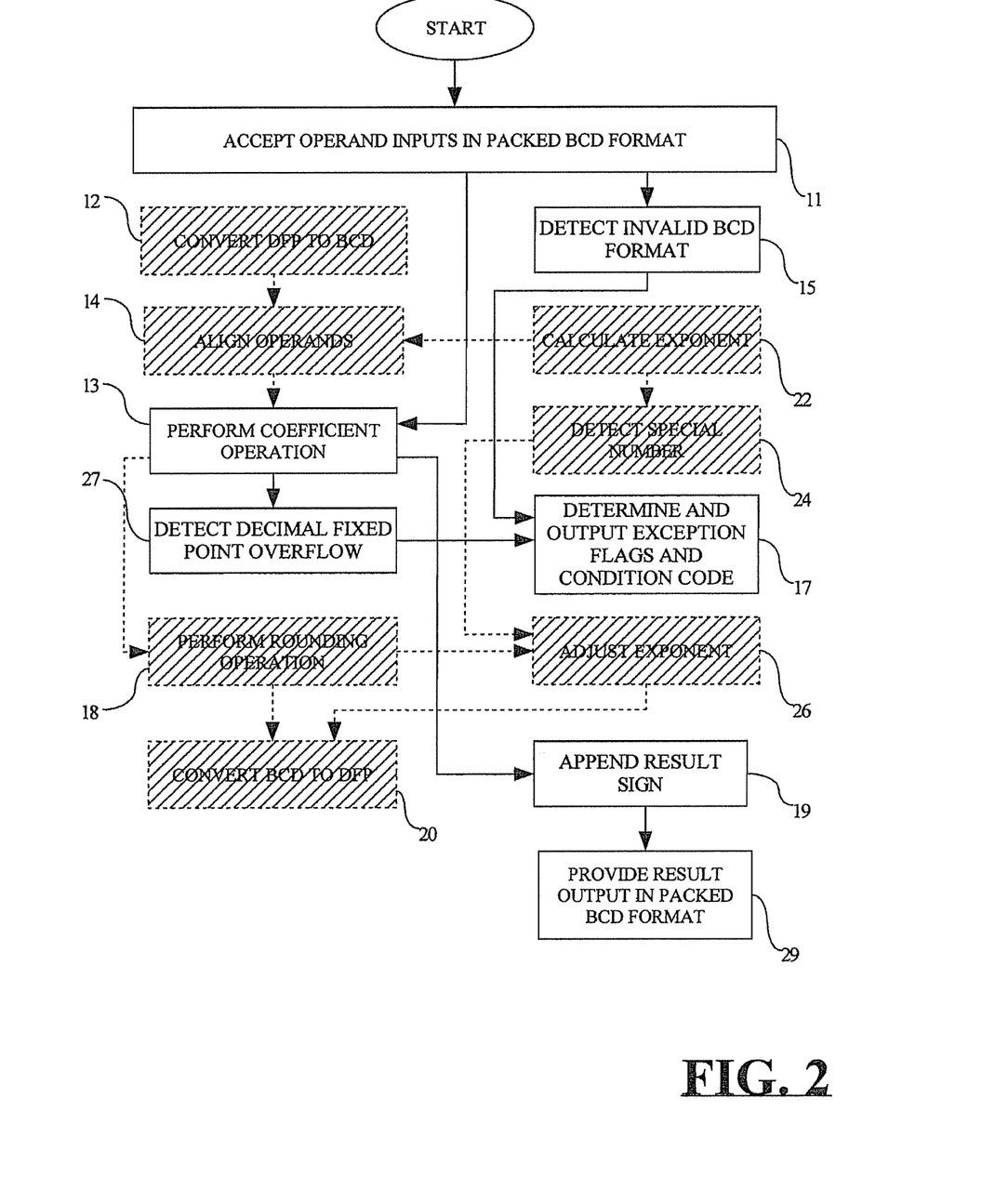
FIG. 2 sets forth an illustrative method for using a decimal floating point unit to execute a fixed point instruction.

FIG. 2 sets forth an illustrative method for using a decimal floating point unit to execute a fixed point instruction. The shaded blocks in FIG. 2 are not used, but are shown for explanatory purposes to facilitate a comparison with the prior art procedure of FIG. 1. These shaded blocks include convert DFP to BCD 12, align operands 14, perform rounding operation 18, convert BCD to DFP 20, calculate exponent 22, detect special number 24, and adjust exponent 26.

The procedure of FIG. 2 commences at block 11 where one or more operand inputs are accepted in a packed BCD format which consists of a string of 4-bit numeric BCD digits (unsigned packed decimal format) and may be followed by a BCD sign digit (signed packed decimal format). Next, any invalid BCD digits are detected at block 15. For example, invalid formats may be detected at block 15 by checking the operands for any invalid BCD codes. Depending on the specifics of a given operation, these BCD codes may be in signed or unsigned packed decimal format. Next, at block 17, exception flags and condition codes are determined and outputted.

Block 15 may be performed in parallel with block 13, or block 15 may be performed in any order with respect to block 13. At block 13, a coefficient operation is performed on the operand inputs that were accepted at block 11. Note that this procedure bypasses the prior art DFP to BCD conversion step of block 12 and the prior art operand alignment step of block 14. The coefficient operation of block 13 takes place directly on the BCD data in a similar fashion to that of a DFP operation, effectively reusing this hardware for these BCD operations. The results of these BCD operations may be a sum, difference, product, quotient, conversion from binary conversion to binary, or any of several other possible operations performed on the operand inputs.

At block 19, a result sign is appended to the result of the coefficient operation that was determined at block 15. Then, at block 29, the result of the coefficient operation of block 13 along with the appended result sign of block 19, is provided as a result output in packed BCD format. Blocks 27 and 19 may be performed in parallel or in any order. At block 27, any decimal fixed point overflow is detected. Block 27 is performed by comparing the number of non-zero digits in the result of the coefficient operation to a length field provided by an instruction for the purpose of fixed point overflow detection. Based upon the result of the overflow detection at block 27, the exception flags and condition codes for fixed point operations are computed and outputted at block 17.

One important factor in the computation of decimal fixed point operations on a decimal floating point stack relates to preventing an exponent stack from affecting the result. Thus, any output generated by the prior art detect special number 24 block or the exponent results provided by the coefficient operation of block 13 must be prevented from affecting the result, condition codes, or exceptions generated by the decimal fixed point operation at block 17. The procedure of FIG. 2 accomplishes the foregoing purposes and objectives.

Figure 3:
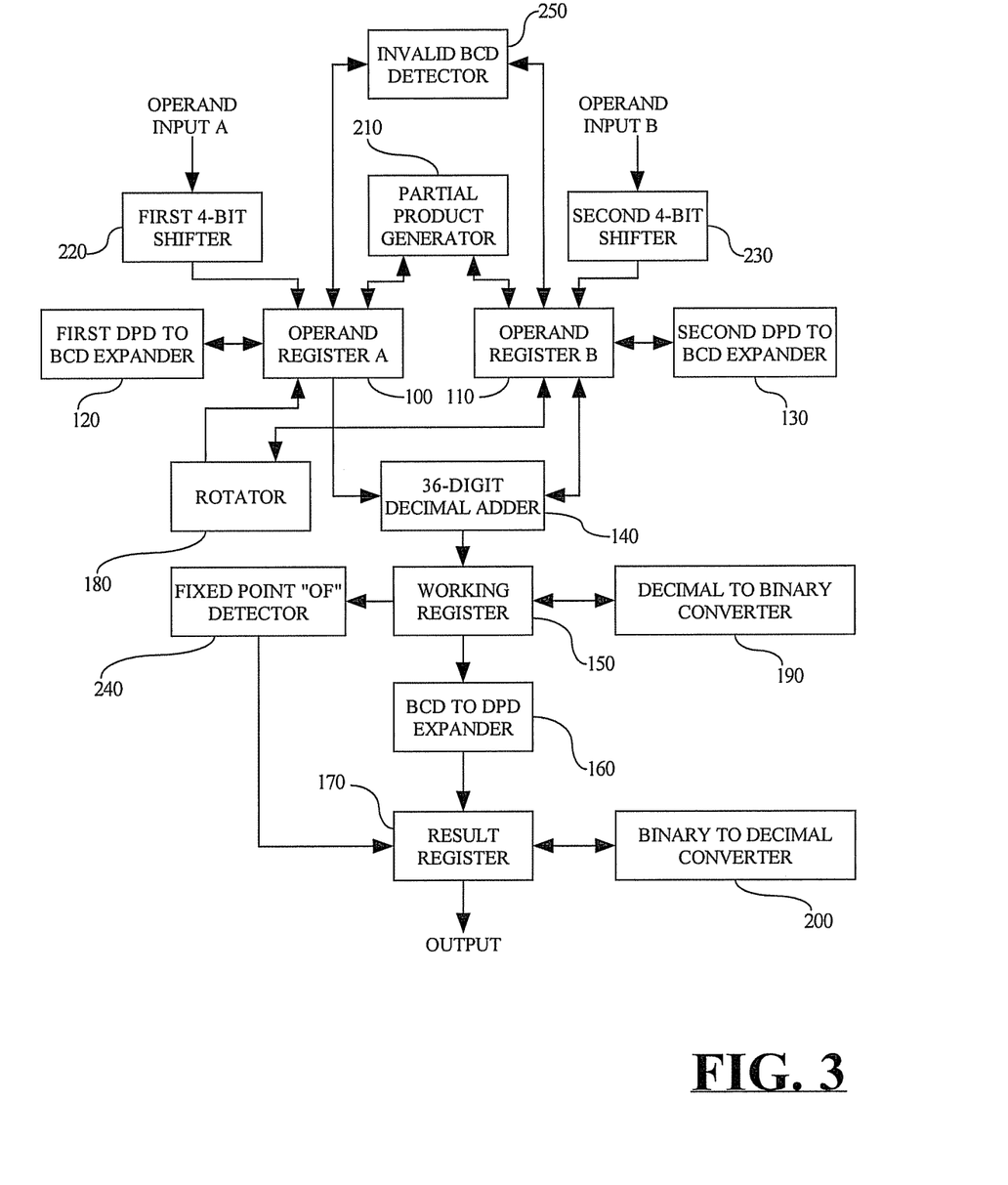
FIG. 3 sets forth an illustrative hardware configuration for an enhanced decimal floating point unit that is capable of executing decimal fixed point operations.

[SRC2]FIG. 3 sets forth an illustrative hardware configuration for an enhanced decimal floating point unit that is capable of executing decimal fixed point operations. The discussion of FIG. 3 will begin with a description on the differences between how a fixed point addition or subtraction operation is executed versus how a decimal floating point addition or subtraction is executed on this enhanced decimal floating point unit.

Instruction execution for both fixed-point operations and floating-point operations begin with latching each of respective operand inputs into a corresponding operand register. For example, an operand input A for a first operand is latched into an operand register A 100 and an operand input B for a second operand B is latched into an operand register B 110. However, because packed fixed point operands, including operand input A and operand input B, have a 4-bit sign digit appended to the end of them, the respective operands are each shifted, on-the-fly, by 4 bits to the right in corresponding first 4-bit shirt register 220 (for operand A) and corresponding second 4-bit shift register 230 (for operand B) before the shifted operands are latched into operand register A 100 and operand register B 110. For fixed point operations, the operands are also sent from operand register A 100 and operand register B 110 to an invalid BCD detector 250 that performs a test to determine if the operands contain valid packed signed BCD or packed unsigned BCD numbers, depending on the operation.

The first step in a decimal floating point operation is to convert the coefficients of the operands from a DFP format (the coefficient is in a compressed format called Densely Packed Decimal DPD) to Binary Coded Decimal Format (or BCD). This step is performed using a first DPD to BCD expander 120 for operand A as stored in operand register A 100, and a second DPD to BCD expander 130 for shifted operand B as stored in operand register B 110. Exponent information for operands A and B is sent to an exponent stack (not shown).

On a next cycle for performing the decimal floating point operation, operands A and B, which are now in BCD notation, are sent to a 36-digit decimal adder 140 and a rotator 180. The rotator 180 output is latched into operand register A 100 and operand register B 110 on the next cycle after the present cycle if operand alignment is needed based on the exponents of the operands. However, for decimal fixed point operations, the DPD to BCD conversion process and conditional rotation is skipped and the operand data is sent directly to the 36-digit decimal adder 140. The next few steps of the operation now execute the same regardless of whether an operation to be performed on operands A and B is to be a decimal floating point operation or a fixed point decimal operation. For example, for addition or subtraction operations, the results flow down through the 36-digit decimal adder 140.

Once the addition operation is complete, the decimal floating point operation must conditionally round the result, requiring the results to loop back from the 36-digit decimal adder 140 to the Operand Register B 110 so that a rounding routine may commence. The rounding routine includes passing the result down through the 36-digit decimal adder 140 on a first cycle of the rounding routine and incrementing the result through the 36-digit decimal adder 140 on a second cycle of the rounding routine. On a third cycle of the rounding routine, a working register 150 selects either the original result or the incremented result, based on at least one of a guard digit and a sticky digit, and on a rounding mode. Fixed point decimal operations however do not require this rounding and instead the result is sent directly to working register 150.

Finally, the decimal floating point addition or subtraction result must be combined back with the exponent and the BCD data must be recombined with the exponent and sign information of the result through a BCD to DPD expander 160. However, for fixed point decimal operations this step is not needed. Instead, the result is sent directly to a result register 170 where the sign can be appended and the result can be outputted. In parallel, the result is checked for fixed point overflow in the fixed point overflow (OF) detector 240 which uses the length field of the result specified in the instruction text to determine if there are too many non-zero result digits, which generates the overflow condition.

Figure 4:
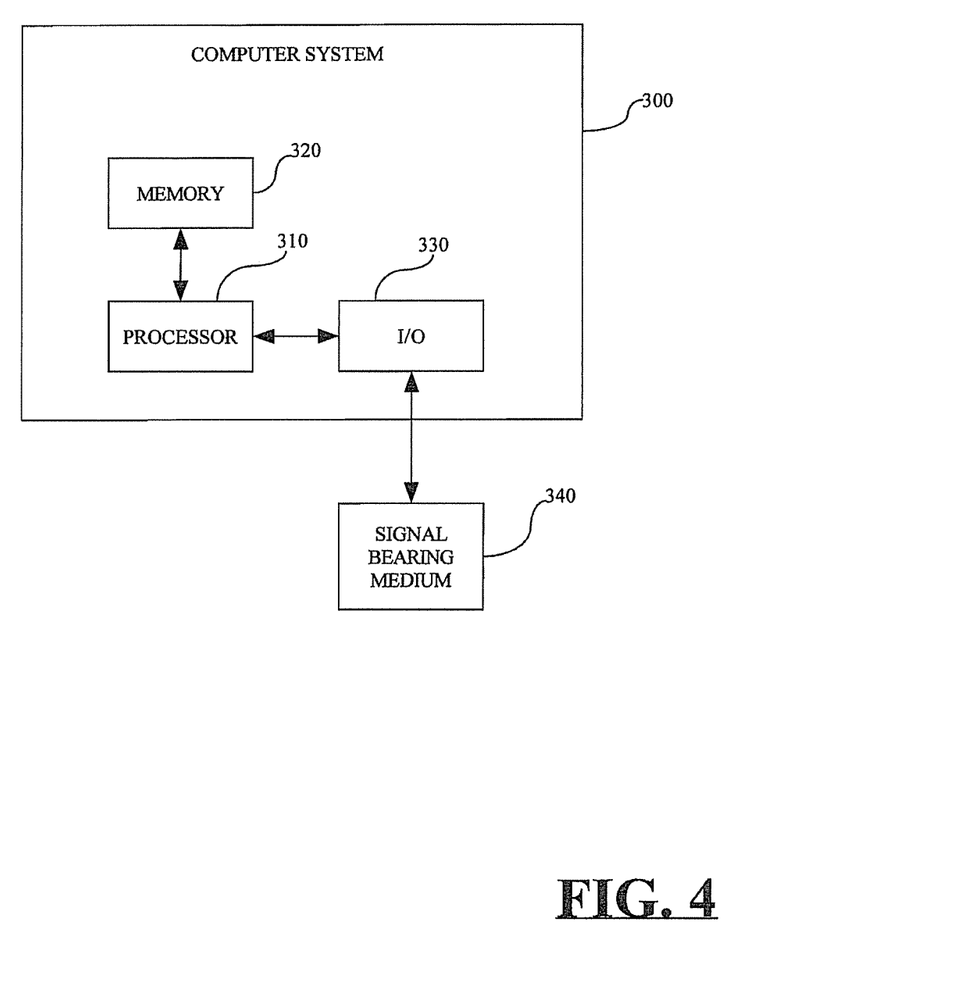
FIG. 4 sets forth an illustrative computer program product or hardware product for implementing an enhanced decimal floating point unit that is capable of executing decimal fixed point operations.

FIG. 4 sets forth an illustrative computer program product or hardware product for implementing an enhanced decimal floating point unit that is capable of executing decimal fixed point operations. The system includes a computer 300 operatively coupled to a signal bearing medium 340 via an input/output interface (I/O) 330. The signal bearing medium 340 may include a representation of instructions for implementing an enhanced decimal floating point unit that is capable of executing decimal fixed point operations, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for implementing an enhanced decimal floating point unit that is capable of executing decimal fixed point operations, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program for implementing an enhanced decimal floating point unit that is capable of executing decimal fixed point operations. The processor 310 implements instructions for using a decimal floating point (DFP) unit to execute a fixed point instruction. The instructions implement a method comprising accepting two or more operands each in a packed binary coded decimal (BCD) format; detecting any invalid BCD formats by checking the operands for any invalid BCD codes; determining if an exception flag exists and, if so, outputting the exception flag; determining if a condition code exists and, if so, outputting the condition code; performing a coefficient operation on the accepted two or more operand inputs to generate a result; wherein the coefficient operation takes place directly on BCD data, thus using the DFP unit to perform a BCD operation comprising the coefficient operation; appending a result sign to the result of the coefficient operation; and providing the result of the coefficient operation and the appended result sign as a result output in a packed BCD format. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer-implemented method for using a decimal floating point (DFP) circuit to execute a fixed point instruction, the method comprising:

accepting, by the DFP circuit of a computer, two operands, the two operands both comprising one of a DFP format and a packed binary coded decimal (BCD) format;

executing the fixed point instruction by the DFP circuit based on the two operands both comprising the packed BCD format, wherein executing the fixed point instruction comprises:

shifting each of the two operands to remove respective signs by first and second shifters of the DFP circuit;

storing the shifted two operands in first and second operand registers of the DFP circuit;

detecting any invalid BCD formats in the two operands in the first and second operand registers by checking the shifted two operands for any invalid BCD codes;

performing a coefficient operation on the two operands in the operand registers to generate a result by a decimal adder of the DFP circuit, wherein the coefficient operation takes place directly on the BCD data comprising the accepted two or more operands, and the accepted two or more operands are not converted from another format by the DFP circuit before performing the coefficient operation, thus using the DFP circuit to perform a BCD operation comprising the coefficient operation;

storing the result of the coefficient operation in a working register of the DFP circuit;

determining that an exception flag exists based on the result in the working register and, based on the exception flag existing, outputting the exception flag;

determining that a condition code exists based on the result in the working register and, based on the condition code existing, outputting the condition code;

storing the result in a result register of the DFP circuit;

appending a result sign to the result of the coefficient operation in the result register; and providing the result of the coefficient operation and the appended result sign from the result register as a result output of the DFP circuit in the packed BCD format; and based on the two operands both comprising the DFP format, executing a DFP instruction by the first and second operand registers, the decimal adder, the working register, and the result register of the DFP circuit;

wherein executing the DFP instruction comprises:

expanding each of the two operands by first and second densely packed decimal (DPD) to BCD expanders of the DFP circuit; and storing the expanded two operands in the first and second operand registers of the DFP circuit;

performing, by a rotator and the decimal adder of the DFP circuit, a coefficient operation on the two operands in the operand registers to generate the result;

rounding the result by the decimal adder;

storing the rounded result of the coefficient operation in a working register of the DFP circuit;

appending an exponent to the result of the coefficient operation by a BCD to DPD expander of the DFP circuit;

storing the result and the appended exponent in the result register of the DFP circuit; and providing the result of the coefficient operation and the appended exponent as a result output of the DFP circuit in the DFP format.

2. The method of claim 1 wherein checking the operands for any invalid BCD codes is performed on one or more operands in signed or unsigned packed decimal format.

3. The method of claim 1 wherein the result of the coefficient operation is a sum, a difference, a product, a quotient, a conversion from binary, or a conversion to binary.

4. The method of claim 1 further comprising:

detecting any decimal fixed point overflow in the result in the working register by a fixed point overflow detector of the DFP circuit by comparing a number of non-zero digits in the result of the coefficient operation to a length field provided by an instruction for implementing a fixed point overflow detection;

determining and outputting the exception flag and the condition code based on detection of any decimal fixed point overflow; and preventing an exponent stack from affecting a result of the coefficient operation and the determination of the condition code and the exception flag.

5. A decimal floating point (DFP) circuit of a computer, the DFP circuit being configured to execute a fixed point instruction by a method including:

accepting, by the DFP circuit of the computer, two operands, the two operands both comprising one of a DFP format and a packed binary coded decimal (BCD) format;

executing the fixed point instruction by the DFP circuit based on the two operands both comprising the packed BCD format, wherein executing the fixed point instruction comprises:

shifting each of the two operands to remove respective signs by first and second shifters of the DFP circuit;

storing the shifted two operands in first and second operand registers of the DFP circuit;

detecting any invalid BCD formats in the two operands in the first and second operand registers by checking the shifted two operands for any invalid BCD codes;

performing a coefficient operation on the two operands in the operand registers to generate a result by a decimal adder of the DFP circuit, wherein the coefficient operation takes place directly on the BCD data comprising the accepted two or more operands, and the accepted two or more operands are not converted from another format by the DFP circuit before performing the coefficient operation, thus using the DFP circuit to perform a BCD operation comprising the coefficient operation;

storing the result of the coefficient operation in a working register of the DFP circuit;

determining that an exception flag exists based on the result in the working register and, based on the exception flag existing, outputting the exception flag;

determining that a condition code exists based on the result in the working register and, based on the condition code existing, outputting the condition code;

storing the result in a result register of the DFP circuit;

appending a result sign to the result of the coefficient operation in the result register; and providing the result of the coefficient operation and the appended result sign from the result register as a result output of the DFP circuit in the packed BCD format; and based on the two operands both comprising the DFP format, executing a DFP instruction by the first and second operand registers, the decimal adder, the working register, and the result register of the DFP circuit;

wherein executing the DFP instruction comprises:

expanding each of the two operands by first and second densely packed decimal (DPD) to BCD expanders of the DFP circuit; and storing the expanded two operands in the first and second operand registers of the DFP circuit;

performing, by a rotator and the decimal adder of the DFP circuit, a coefficient operation on the two operands in the operand registers to generate the result;

rounding the result by the decimal adder;

storing the rounded result of the coefficient operation in a working register of the DFP circuit;

appending an exponent to the result of the coefficient operation by a BCD to DPD expander of the DFP circuit;

storing the result and the appended exponent in the result register of the DFP circuit; and providing the result of the coefficient operation and the appended exponent as a result output of the DFP circuit in the DFP format.

6. The computer program product of claim 5 wherein checking the operands for any invalid BCD codes is performed on one or more operands in signed or unsigned packed decimal format.

7. The computer program product of claim 5 wherein the result of the coefficient operation is a sum, a difference, a product, a quotient, a conversion from binary, or a conversion to binary.

8. The computer program product of claim 5 further comprising:
   detecting any decimal fixed point overflow in the result in the working register by a fixed point overflow detector of the DFP circuit by comparing a number of non-zero digits in the result of the coefficient operation to a length field provided by an instruction for implementing a fixed point overflow detection;
   determining and outputting the exception flag and the condition code based on detection of any decimal fixed point overflow; and
   preventing an exponent stack from affecting a result of the coefficient operation and the determination of the condition code and the exception flag.

9. A hardware product comprising a storage medium readable by a processing circuit and storing instructions for execution by the processing circuit for facilitating a method for using a decimal floating point (DFP) circuit to execute a fixed point instruction, the method including:
   accepting, by the DFP circuit of a computer, two operands, the two operands both comprising one of a DFP format and a packed binary coded decimal (BCD) format;
   executing the fixed point instruction by the DFP circuit based on the two operands both comprising the packed BCD format, wherein executing the fixed point instruction comprises:
      shifting each of the two operands to remove respective signs by first and second shifters of the DFP circuit;
      storing the shifted two operands in first and second operand registers of the DFP circuit;
      detecting any invalid BCD formats in the two operands in the first and second operand registers by checking the shifted two operands for any invalid BCD codes;
      performing a coefficient operation on the two operands in the operand registers to generate a result by a decimal adder of the DFP circuit, wherein the coefficient operation takes place directly on the BCD data comprising the accepted two or more operands, and the accepted two or more operands are not converted from another format by the DFP circuit before performing the coefficient operation, thus using the DFP circuit to perform a BCD operation comprising the coefficient operation;
      storing the result of the coefficient operation in a working register of the DFP circuit;
      determining that an exception flag exists based on the result in the working register and, based on the exception flag existing, outputting the exception flag;
      determining that a condition code exists based on the result in the working register and, based on the condition code existing, outputting the condition code;
      storing the result in a result register of the DFP circuit;
      appending a result sign to the result of the coefficient operation in the result register; and
      providing the result of the coefficient operation and the appended result sign from the result register as a result output of the DFP circuit in the packed BCD format; and
   based on the two operands both comprising the DFP format, executing a DFP instruction by the first and second operand registers, the decimal adder, the working register, and the result register of the DFP circuit;
   wherein executing the DFP instruction comprises:
      expanding each of the two operands by first and second densely packed decimal (DPD) to BCD expanders of the DFP circuit; and
      storing the expanded two operands in the first and second operand registers of the DFP circuit;
      performing, by a rotator and the decimal adder of the DFP circuit, a coefficient operation on the two operands in the operand registers to generate the result;
      rounding the result by the decimal adder;
      storing the rounded result of the coefficient operation in a working register of the DFP circuit;
      appending an exponent to the result of the coefficient operation by a BCD to DPD expander of the DFP circuit;
      storing the result and the appended exponent in the result register of the DFP circuit; and
      providing the result of the coefficient operation and the appended exponent as a result output of the DFP circuit in the DFP format.

10. The hardware product of claim 9 wherein checking the operands for any invalid BCD codes is performed on one or more operands in signed or unsigned packed decimal format.

11. The hardware product of claim 9 wherein the result of the coefficient operation is a sum, a difference, a product, a quotient, a conversion from binary, or a conversion to binary.

12. The hardware product of claim 9 further comprising:
   detecting any decimal fixed point overflow in the result in the working register by a fixed point overflow detector of the DFP circuit by comparing a number of non-zero digits in the result of the coefficient operation to a length field provided by an instruction for implementing a fixed point overflow detection;
   determining and outputting the exception flag and the condition code based on detection of any decimal fixed point overflow; and
   preventing an exponent stack from affecting a result of the coefficient operation and the determination of the condition code and the exception flag.

* * * * *